US012620883B2

(12) United States Patent

Wu

(10) Patent No.: US 12,620,883 B2

(45) Date of Patent: May 5, 2026

(54) FAST FLASH ANALOG-TO-DIGITAL CONVERTER

(71) Applicant: Murata Manufacturing Co., Ltd., Kyoto (JP)

(72) Inventor: Gary Chunshien Wu, San Diego, CA (US)

(73) Assignee: Murata Manufacturing Co., Ltd., Kyoto (JP)

( * ) Notice: Subject to any disclaimer, the term of this patent is extended or adjusted under 35 U.S.C. 154(b) by 151 days.

(21) Appl. No.: 18/357,891

(22) Filed: Jul. 24, 2023

(65) Prior Publication Data

US 2025/0038636 A1 Jan. 30, 2025

(51) Int. Cl.
 H02M 3/04 (2006.01)
 H02M 1/00 (2006.01)

(52) U.S. Cl.
 CPC ........... H02M 1/0003 (2021.05); H02M 3/04 (2013.01)

(58) Field of Classification Search
 CPC ........ H02M 3/00; H02M 3/007; H02M 3/158; H02M 1/0003; H02M 1/0006; H02M 1/08; H02M 7/4837
 See application file for complete search history.

(56) References Cited

U.S. PATENT DOCUMENTS

| | | | |
|---|---|---|---|
| 7,764,526 B1 * | 7/2010 | Xing | H02M 3/07 |
| | | | 363/60 |
| 10,686,367 B1 | 6/2020 | Low | |
| 10,720,842 B1 * | 7/2020 | Wu | H02M 3/1584 |
| 10,720,843 B1 | 7/2020 | Wu et al. | |
| 10,770,974 B2 | 9/2020 | Wu et al. | |
| 10,992,226 B1 * | 4/2021 | Aboueldahab | H02M 3/072 |
| 2023/0148059 A1 | 5/2023 | Szczeszynski | |

* cited by examiner

*Primary Examiner* — Benyam Haile

(74) *Attorney, Agent, or Firm* — Haynes and Boone, LLP

(57) ABSTRACT

A 2-bit fast flash analog-to-digital converter circuit and related methods designed for use with multi-level converters in particular to achieve: high conversion speed, high resolution, small layout area, low power, and the ability to meet the requirements for properly balancing fly capacitor voltages. One embodiment includes a voltage input configured to be coupled to a multi-level converter fly capacitor; a comparator coupled to the voltage input and a first reference voltage input and having a first binary output indicating whether the input voltage is higher or lower than a voltage on the first reference voltage input; and a circuit coupled to the voltage input and to second and third reference voltage inputs, the circuit configured to provide a second binary output indicating whether the input voltage is inside or outside a voltage window defined by respective voltages on the second reference and third reference voltage inputs.

22 Claims, 11 Drawing Sheets

500

_700_

800

_1100_

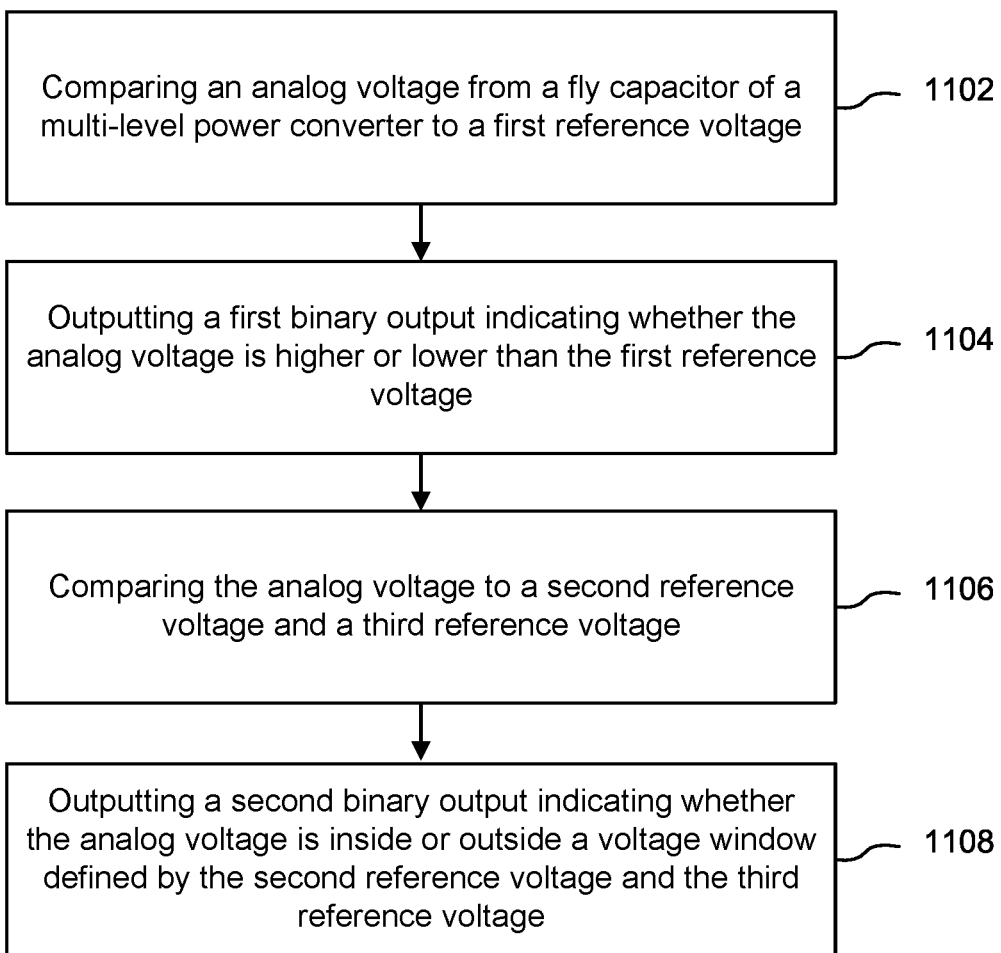

Comparing an analog voltage from a fly capacitor of a multi-level power converter to a first reference voltage — 1102

Outputting a first binary output indicating whether the analog voltage is higher or lower than the first reference voltage — 1104

Comparing the analog voltage to a second reference voltage and a third reference voltage — 1106

Outputting a second binary output indicating whether the analog voltage is inside or outside a voltage window defined by the second reference voltage and the third reference voltage — 1108

FIG. 11

FAST FLASH ANALOG-TO-DIGITAL CONVERTER

BACKGROUND

(1) Technical Field

This invention relates to electronic circuits, and more particularly to fast flash analog-to-digital converters.

(2) Background

Many electronic products, particularly mobile computing and/or communication products and components (e.g., notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-3V). Still other circuitry may require an intermediate voltage level (e.g., 5-10V).

Direct current power converters are often used to generate a lower or higher voltage from a common power source, such as a battery, solar cells, and rectified AC sources. Power converters which generate a lower output voltage level from a higher input voltage power source are commonly known as buck converters, so-called because the output voltage $V_{OUT}$ is less than the input voltage $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter or a boost converter depending on which terminals are used for input and output. Some power converters may provide an inverted output.

One type of direct current power converter known as a multi-level power converter includes charge transfer capacitors as energy storage elements coupled by controlled power switches so as to transfer charge from $V_{IN}$ to $V_{OUT}$. Such charge transfer capacitors are commonly known as "fly capacitors" or "pump capacitors". Every time a fly capacitor is used (i.e., not bypassed), the electrical energy flowing through that fly capacitor generally will either charge it or discharge it. This creates a control problem: what configurations and in what order can the fly capacitors be switched while maintaining their average voltage? This is the charge-balance problem that multi-level converter circuits introduce—balancing charge on the fly capacitors in order to maintain their average voltage. Proper multi-level power converter operation requires fly capacitor voltages to be continuously balanced to corresponding target voltages.

Determining a suitable charge-balance method can become exceedingly difficult as the complexity of a multi-level converter circuit increases. Most conventional control methods rely on establishing a sequence of linked state-changes to try to achieve charge balance. Control systems based on long sequences of power switch states generally assume that all system variables—such as input voltage and output current—are constant during the sequence. This is unrealistic for a real-world environment, where all system variables tend to be dynamic. In particular, the voltage across each fly capacitor is a dynamic variable, the value of which is a useful—and often necessary—factor in determining charge-balance across the fly capacitors of a multi-level converter circuit.

Accordingly, there is a need for circuits and methods for more effectively and efficiently determining the voltage across each fly capacitor of a multi-level converter circuit. The present invention addresses this and other needs, and has applicability beyond multi-level converter circuits.

SUMMARY

The present invention encompasses a 2-bit fast flash analog-to-digital converter (ADC) circuit and related methods. The 2-bit fast flash ADC has been designed for use with multi-level converters in particular to achieve all the following: high conversion speed, high resolution, small layout area, low power, and the ability to meet the requirements for properly balancing fly capacitor voltages in a multi-level converter cell. However, the inventive 2-bit fast flash ADC may be used in other applications where such characteristics are desirable.

One embodiment of a fast flash analog-to-digital converter circuit in accordance with the present invention includes a voltage input configured to be coupled to a voltage from a fly capacitor of a multi-level power converter; a comparator having a first input coupled to the voltage input and a second input coupled to a first reference voltage input, the second comparator having a first binary output indicating whether the voltage on the voltage input is higher or lower than a voltage on the first reference voltage input; and a circuit coupled to the voltage input, a second reference voltage input, and a third reference voltage input, the circuit configured to provide a second binary output indicating whether the voltage on the voltage input is inside or outside a voltage window defined by respective voltages on the second reference voltage input and the third reference voltage input.

One method of converting an analog voltage from a fly capacitor of a multi-level power converter to a digital output in accordance with the present invention includes comparing the analog voltage to a first reference voltage; outputting a first binary output indicating whether the analog voltage is higher or lower than the first reference voltage; comparing the analog voltage to a second reference voltage and a third reference voltage; and outputting a second binary output indicating whether the analog voltage is inside or outside a voltage window defined by the second reference voltage and the third reference voltage.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 11 is a process flow chart showing one method for converting an analog voltage from a fly capacitor of a multi-level power converter to a digital output.

Like reference numbers and designations in the various drawings indicate like elements.

DETAILED DESCRIPTION

The present invention encompasses a 2-bit fast flash analog-to-digital converter (ADC) circuit and related methods. The 2-bit fast flash ADC has been designed for use with multi-level converters in particular to achieve all the following: high conversion speed, high resolution, small layout area, low power, and the ability to meet the requirements for properly balancing fly capacitor voltages in a multi-level converter cell. However, the inventive 2-bit fast flash ADC may be used in other applications where such characteristics are desirable.

Figure 1:
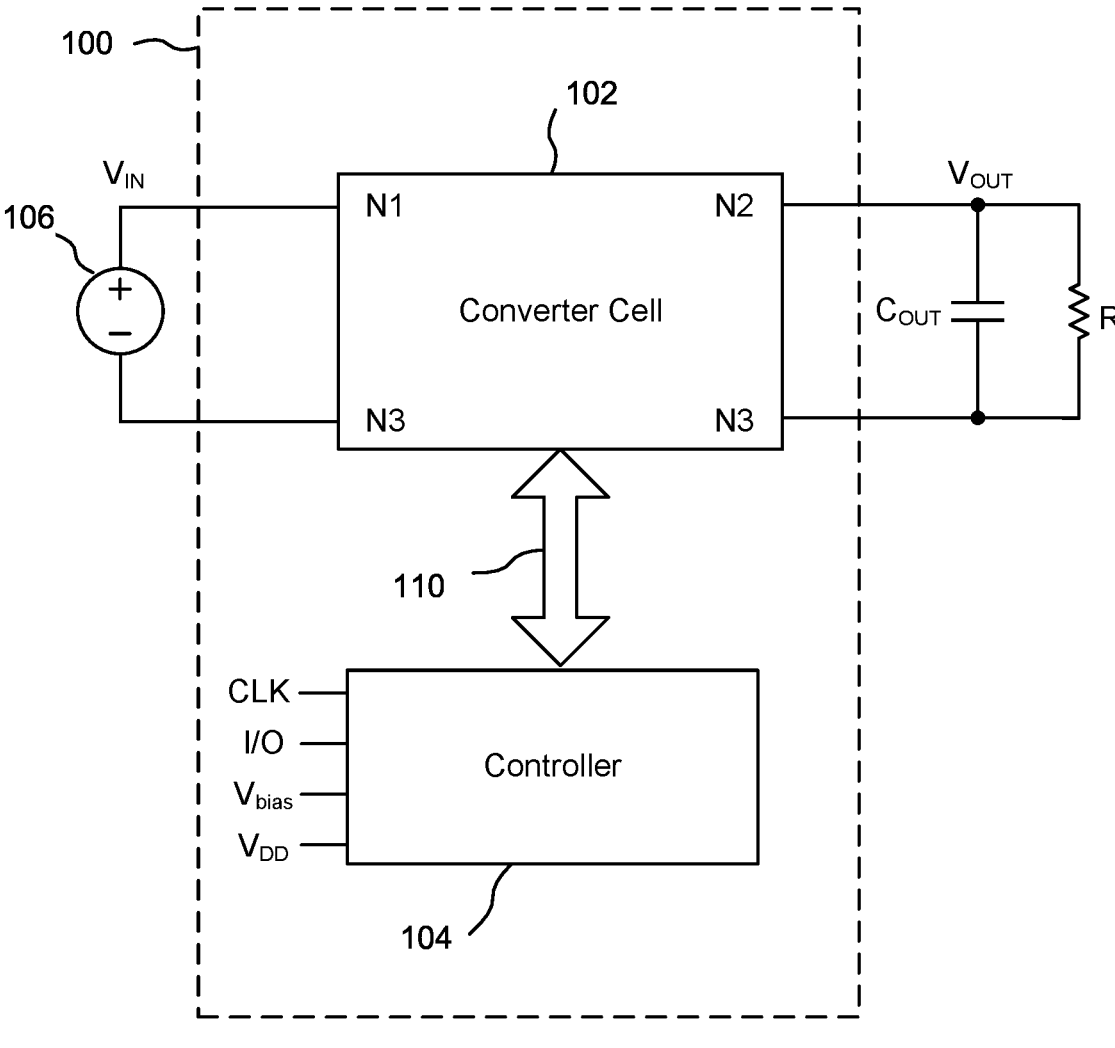
FIG. 1 is a block diagram of a circuit that includes a prior art power converter.

FIG. 1 is a block diagram of a circuit that includes a prior art power converter 100. In the illustrated example, the power converter 100 includes a converter cell 102 and a controller 104. The converter cell 102 is configured to receive an input voltage $V_{IN}$ from a voltage source 106 (e.g., a battery) across terminals N1 and N3 (common), and transform the input voltage $V_{IN}$ into an output voltage $V_{OUT}$ across terminals N2 and N3 (common). The output voltage $V_{OUT}$ is generally coupled across an output capacitor $C_{OUT}$, across which may be connected a load represented as an equivalent resistance R. In some embodiments of the power converter 100, auxiliary circuitry (not shown), such as a bias voltage generator(s), a clock generator, a voltage control circuit, etc., may also be present and coupled to the converter cell 102 and the controller 104.

The controller 104 receives a set of input signals and produces a set of output signals. Some of these input signals arrive along a signal path 110 connected to the converter cell 102. Some input signals carry information indicative of the operational state of the converter cell 102. The controller 104 generally also receives at least a clock/timing signal CLK and one or more external input/output signals I/O that may be analog, digital (encoded or direct signal lines), or a combination of both. Based upon the received input signals, the controller 104 produces a set of control signals back to the converter cell 102 on the signal path 110 that control the internal components of the converter cell 102 (e.g., internal integrated or external discrete power switches, such as FETs, especially MOSFETs) to cause the converter cell 102 to convert $V_{IN}$ to $V_{OUT}$.

Figure 2:
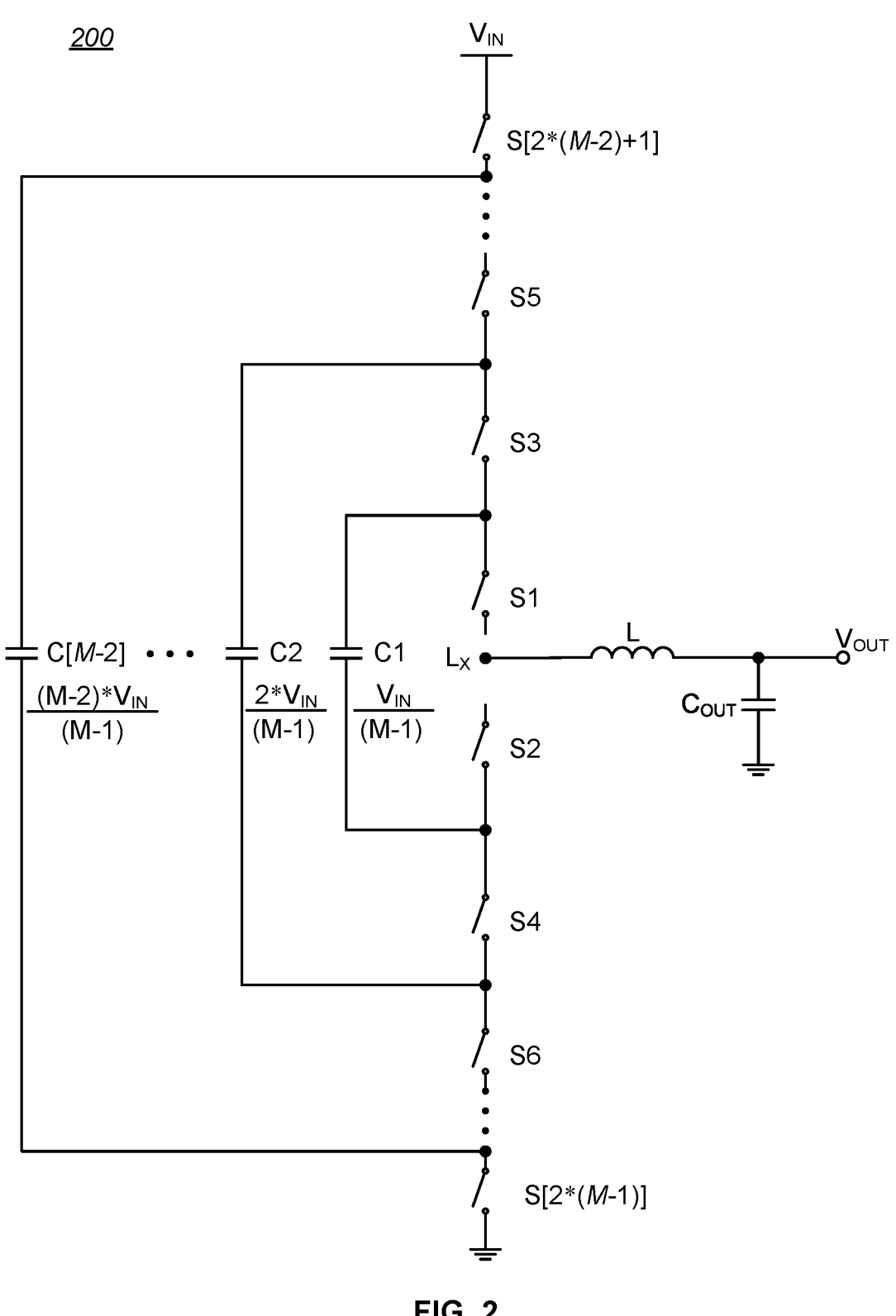
FIG. 2 is schematic diagram of a generalized M-level multi-level converter cell that may be used as the converter cell of FIG. 1.

In some power converter designs, the converter cell 102 may comprise a multi-level converter circuit. For example, FIG. 2 is schematic diagram of a prior art generalized M-level multi-level converter cell 400 that may be used as the converter cell 102 of FIG. 1. A set of power switches, S1–S[2*(M–1)], is series-coupled between $V_{IN}$ and circuit ground. The set of power switches are organized in switch pairs: S1 & S2, S3 & S4, . . . . S[2*(M–2)+1]& S[2*(M–1)]. A set of M–2 fly capacitors Cx is coupled in series with certain respective power switches (see FIG. 3), and in parallel with power switches in between those certain power switches. In terms of switch pairs, there are M–1 pairs of switches, or one more than the number of fly capacitors. Thus, for example, for a 5-level converter cell, there are 3 fly capacitors and 4 pairs of power switches.

An optional inductor L is coupled to an output capacitor $C_{OUT}$ and to a node $L_X$ between power switches S1 and S2. The voltage across the output shunt capacitor $C_{OUT}$ is $V_{OUT}$. The inductor L doubles as a virtual current source that moves all charge between the fly capacitors Cx. This creates a very efficient form of charge transfer, but aggravates the problem of charge-balancing the fly capacitors Cx.

Figure 3:
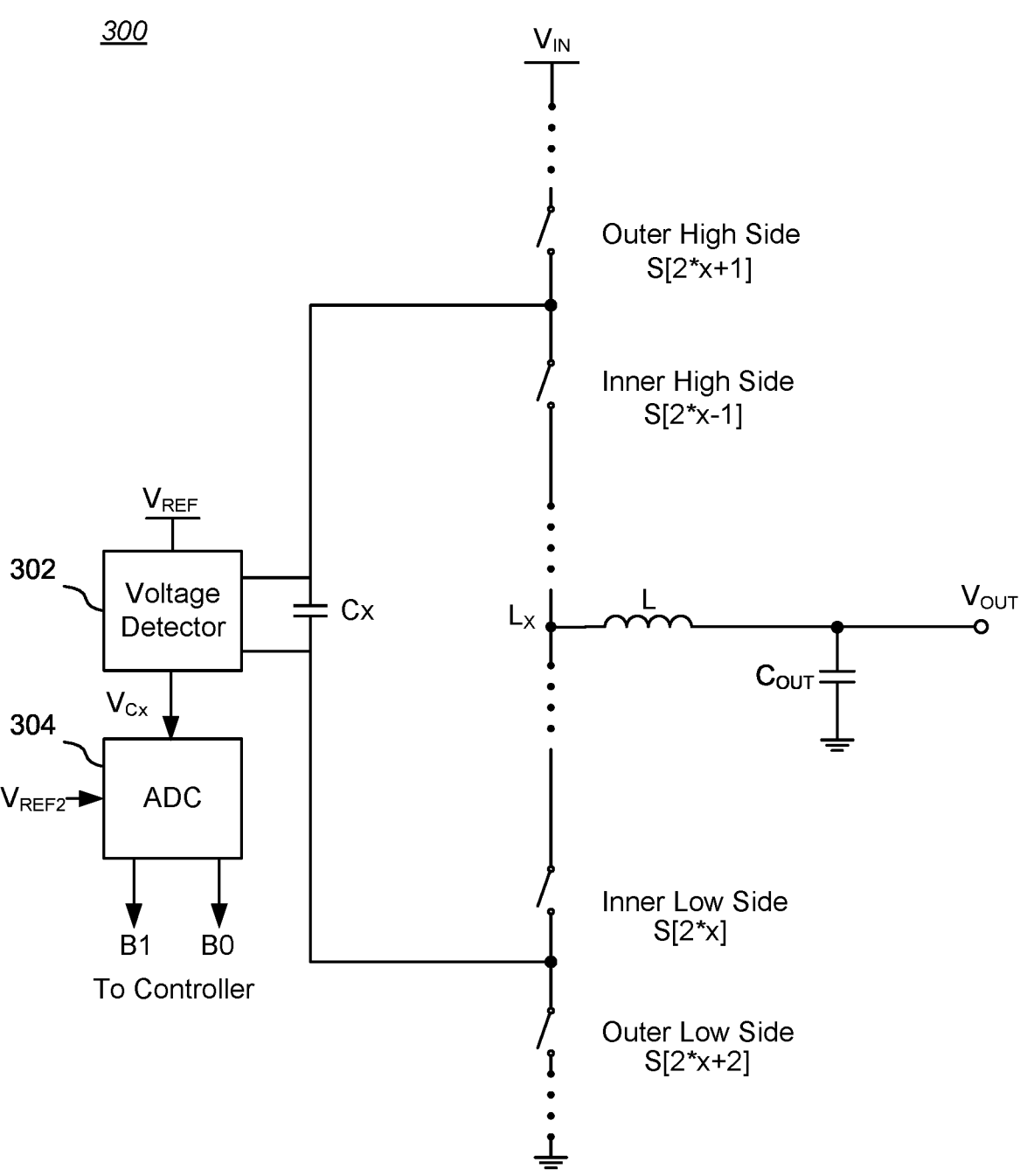
FIG. 3 is schematic diagram of one fly capacitor Cx from FIG. 2 showing corresponding "controlled" power switch sets, a voltage detector, and a novel analog-to-digital converter in accordance with the present invention.

FIG. 3 is schematic diagram 300 of one fly capacitor Cx from FIG. 2 showing corresponding "controlled" power switch sets, a voltage detector 302, and a novel analog-to-digital converter 304 in accordance with the present invention. Each fly capacitor Cx has a first terminal coupled between an outer high-side power switch S[2*x+1] and an inner high-side power switch S[2*x–1], where "high-side" refers to the $V_{IN}$ side of the converter circuit. Each fly capacitor Cx has a second terminal coupled between an outer low-side power switch S[2*x+2] and an inner low-side power switch S[2*x], where "low-side" refers to the reference potential side of the converter circuit (usually circuit ground GND). Thus, for an M=3 multi-level converter cell 200, a first terminal of the single (X=1) fly capacitor C1 would be coupled between outer high-side power switch S3 and inner high-side power switch S1, and a second terminal of the capacitor C1 would be coupled between inner low-side power switch S2 and outer low-side power switch S4. Accordingly, each fly capacitor Cx within the multi-level converter cell 200 has four power switches that can affect current flow through that fly capacitor Cx.

Also shown in FIG. 3 is a voltage detector 302. The voltage detector 302 senses the voltage across a corresponding fly capacitor Cx with respect to one or more reference voltages, $V_{REF}$, which represents a desired target voltage for the fly capacitor Cx. Every fly capacitor Cx has a target average voltage in order to maintain proper output level. For an M-level converter and fly capacitor Cx, where x=1, 2, . . . [M–2], the target voltage for each fly capacitor is:

$$V_{TARGET}[Cx] = V_{IN} * \frac{x}{M-1}$$

In the illustrated example, the voltage detector 302 outputs a signal, $V_{Cx}$, indicating the voltage across the corresponding fly capacitor Cx. The $V_{Cx}$ signal is coupled to an analog-to-digital converter (ADC) 304, which in turn outputs signals B0 and B1 that may be coupled to control circuitry (e.g., controller 104 in FIG. 1) for the power switches associated with the fly capacitor Cx. An additional input to the ADC 304 is a reference voltage $V_{REF2}$, which may be the same as $V_{REF}$.

The control circuitry for the four power switches that can affect current flow through a fly capacitor Cx set states for those power switches in part as a function of the voltage across the fly capacitor Cx as measured by the associated voltage detector 302 and conveyed by $V_{Cx}$ status signal.

The fly capacitor Cx voltages $V_{Cx}$ need to be balanced quickly (on a cycle-by-cycle time scale or shorter, where each cycle can be on the order of about 1 μs) to get to correct levels (e.g., $\frac{1}{4}V_{IN}$, $\frac{1}{2}V_{IN}$, etc.), One sign of fly capacitors starting to go out of balance is that the expected interior voltage levels would deviate from target voltage levels more and more over time, which would force the control loop to adjust the duty cycle of the power converter to compensate and introduce sub-harmonic behavior; eventually, if unchecked, the power converter may get out of regulation.

One way to digitize the voltage information for the fly capacitors Cx is to use a conventional flash ADC for each capacitor. A conventional flash ADC (also known as a direct-conversion ADC) uses a linear voltage ladder with a comparator at each "rung" of the ladder to compare an input voltage to successive reference voltages. The output of these comparators is generally fed into a digital encoder, which converts the inputs into a binary value. In order to obtain the capacitor voltages with adequate resolution to achieve a specified voltage balance tolerance, a large number of bits is often needed. For example, for $V_{IN}$=48V, an 8-bit flash ADC would have a resolution of ½ LSB, which is 0.5*48/256=94 mV. If a voltage balance is specified to be within 100 mV, an 8-bit ADC is needed, but such an ADC requires 255 comparators and thus suffers from a high cost of integrated circuit (IC) area and power consumption. Using a conventional design approach, a total of three 8-bit flash ADCs would be needed for the three fly capacitors C1, C2, C3 of a 5-level multi-level converter cell 200, resulting in 768 comparators and even higher IC area and power consumption.

In considering the characteristics of a multi-level converter and the control algorithms needed to balance fly capacitor voltage(s) to specific targets, the inventor realized that a full 8-bit, 255 comparator ADC was not required for indicating fly capacitor voltages. In a 3-level converter having a single fly capacitor, the balancing algorithm only needs one bit of information indicating either that the fly capacitor voltage is too high or too low from a specified target voltage. However, for higher level multi-level converters with multiple capacitors (e.g., a 5-level power converter having 3 fly capacitors), an additional bit of voltage range/window information is needed so that a priority can be determined of which fly capacitor to balance first. Accordingly, an aspect of the present invention is a 2-bit fast flash ADC circuit designed for use with multi-level converters to achieve all the following: high conversion speed, high resolution, small layout area, low power, and the ability to meet the requirements for properly balancing fly capacitor voltages in a multi-level converter cell.

Figure 4:
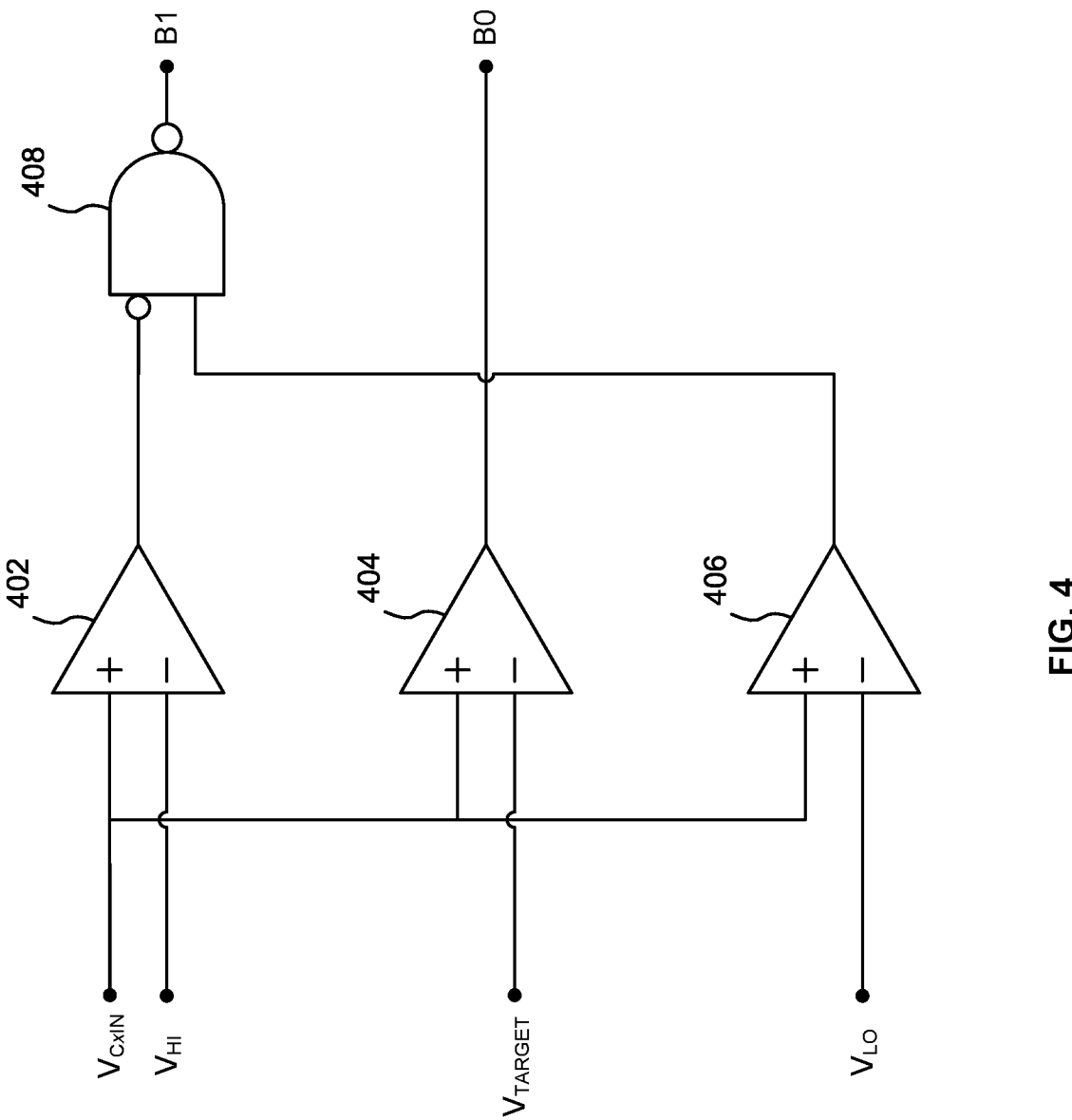
FIG. 4 is a schematic diagram of a first embodiment of a 2-bit fast flash ADC circuit suitable for use as the ADC in the circuit shown in FIG. 3.

FIG. 4 is a schematic diagram of a first embodiment of a 2-bit fast flash ADC circuit 400 suitable for use as the ADC 304 in the circuit shown in FIG. 3. In the illustrated example, a voltage $V_{CxIN}$ representing the voltage $V_{Cx}$ across the plates of a fly capacitor Cx is applied to a first terminal of a first comparator 402, to a first terminal of a second comparator 404, and to a first terminal of a third comparator 406. The voltage $V_{CxIN}$ may equal $V_{Cx}$ or may be a scaled version of $V_{Cx}$ to accommodate the input range of the comparators 402, 404, 406.

A second input of the first comparator 402 is coupled to a specified upper window voltage threshold $V_{HI}$, which may be a scaled version of a general reference voltage $V_{REF2}$ (e.g., 2.5V). Similarly, a second input of the third comparator 406 is coupled to a specified lower window voltage threshold $V_{LO}$, which may be a scaled version of the general reference voltage $V_{REF2}$. A reference voltage $V_{TARGET}$ is coupled to a second input of the second comparator 404, and may be a scaled version of the general reference voltage $V_{REF2}$. The 2-bit fast flash ADC circuit 400 thus uses only 3 comparators, resulting in a much smaller layout area than a conventional 8-bit ADC. The output of the second comparator 404 is a first bit B0.

Figure 6:
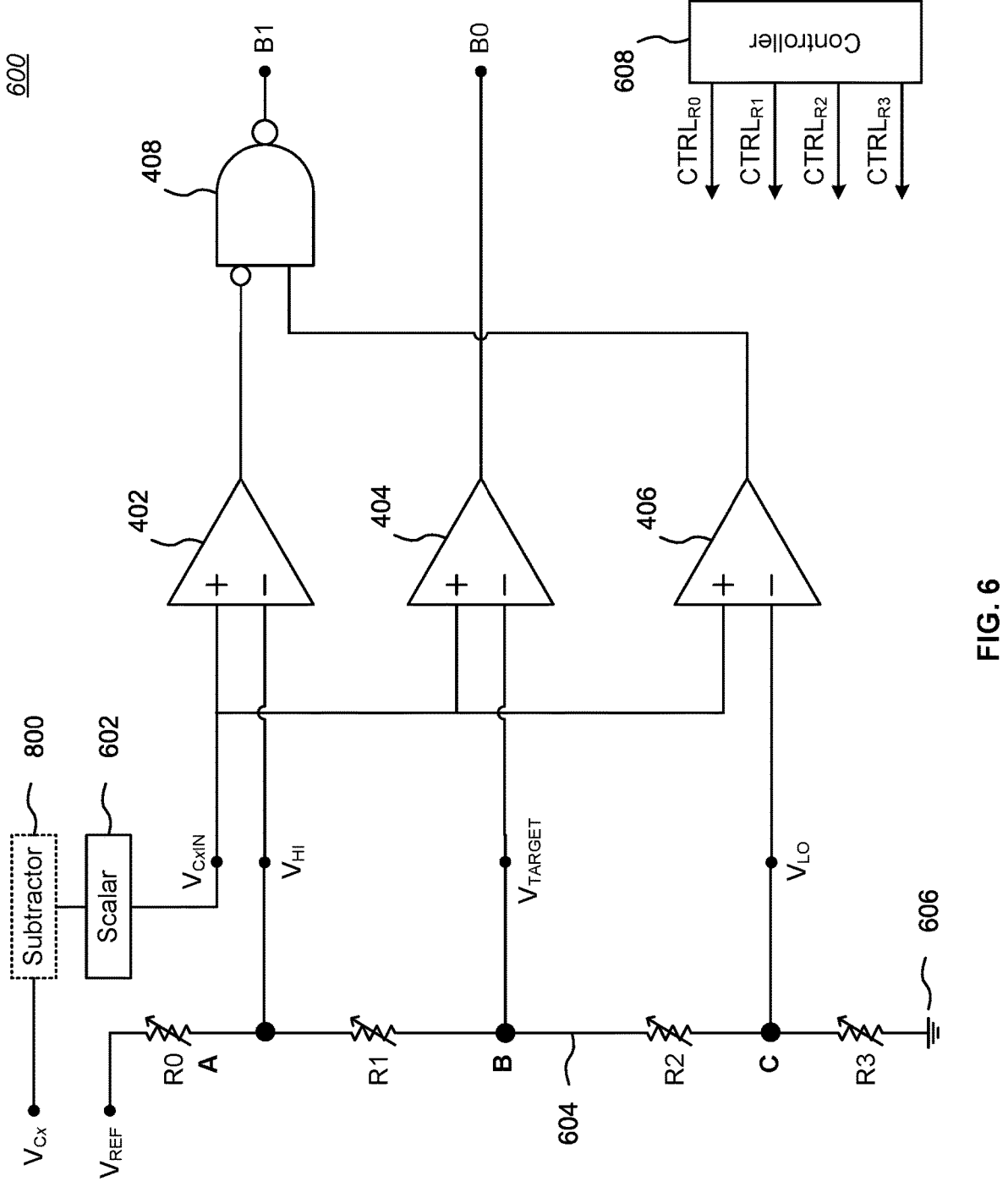
FIG. 6 is a schematic diagram of a second embodiment of a 2-bit flash ADC circuit.

In all cases, manipulating a voltage to obtain a scaled voltage may be accomplished by a number of known circuits, including a resistive divider (see, e.g., FIG. 6).

In the illustrated example, the output of the first comparator 402 is coupled to an inverting input of NAND gate 408, while the output of the third comparator 406 is coupled to a non-inverting input of NAND gate 408. The output of the output of the NAND gate 408 is a second bit B1. As should be appreciated, different combinations of logic elements may be used to implement the functions of the NAND gate 408. The combination of the first comparator 402, the third comparator 406, and the NAND gate 408 may thus be regarded as a circuit that provides a second binary output B1 indicating whether the input voltage $V_{CxIN}$ is inside or outside a voltage window defined by the reference voltage input $V_{HI}$ and the reference voltage input $V_{LO}$.

The first bit B0 indicates whether the voltage $V_{Cx}$ (represented by $V_{CxIN}$) of a particular capacitor Cx is above or below a corresponding target voltage (e.g., $\frac{1}{4}V_{IN}$, $\frac{1}{2}V_{IN}$, etc.)—for example, B0=0 may be taken to indicate that the voltage $V_{Cx}$ is below the target voltage for corresponding capacitor Cx, while B0=1 may be taken to indicate that the voltage $V_{Cx}$ is above the target voltage for corresponding capacitor Cx.

Figure 5:
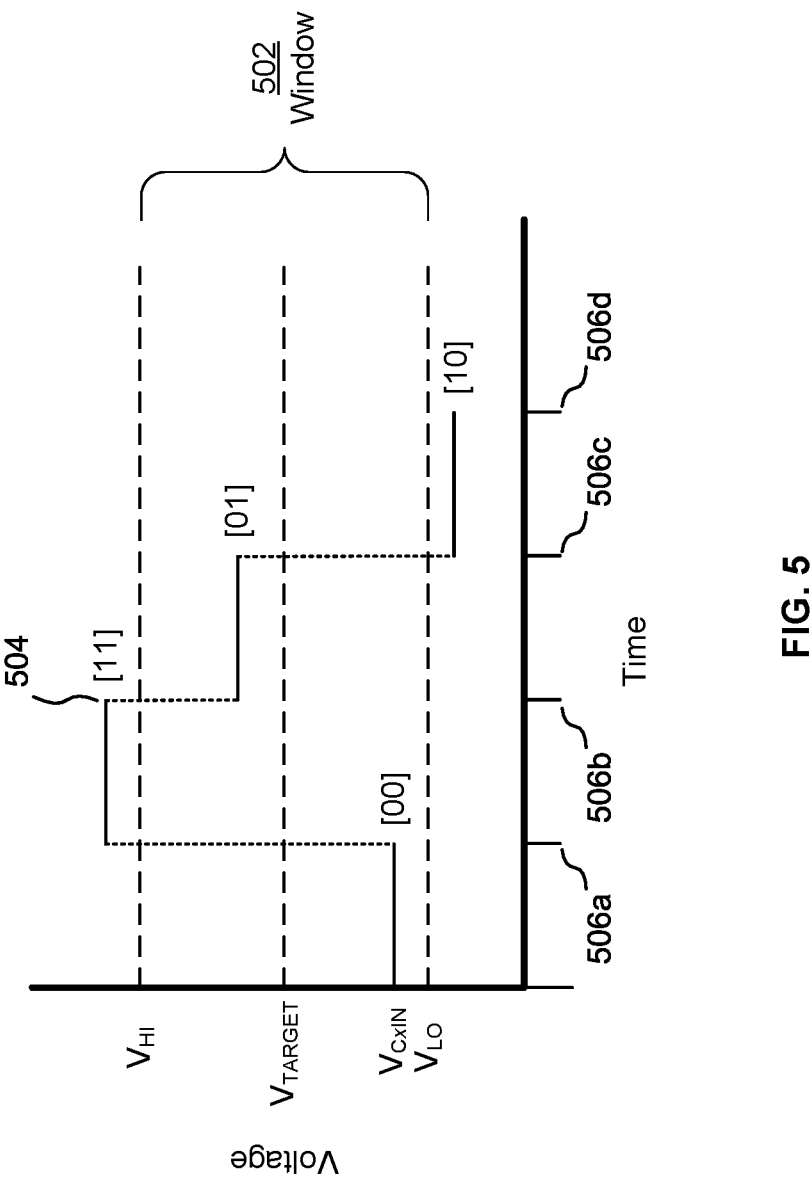
FIG. 5 is a graph of voltages versus time indicating example voltages for $V_{HI}$, $V_{TARGET}$, $V_{LO}$, and $V_{CxIN}$.

The second bit B1 indicates whether the voltage $V_{Cx}$ (represented by $V_{CxIN}$) of a particular capacitor Cx is inside or outside a pre-determined target window, which is a range of voltages around the target voltage for that capacitor Cx (see also FIG. 5). For example, B1=0 may be taken to indicate that the voltage $V_{Cx}$ is inside a specified window (voltage range) for corresponding capacitor Cx, while B1=1 may be taken to indicate that the voltage $V_{Cx}$ is outside a specified window for corresponding capacitor Cx. The B1 bit thus provides additional bit of voltage range/window information needed so that a priority can be determined as to which fly capacitor Cx to balance first.

Once the B1, B0 bit pair is generated for each fly capacitor Cx, that information may be provided to a control system used to balance charge across the fly capacitors Cx by selecting switch states for the set of associated power switches, S1-S[2*(M−1)]. One example of such a control system is set forth in U.S. patent application Ser. No. 17/560,767, filed Dec. 23, 2021, entitled "Controlling Charge-Balance and Transients in a Multi-Level Power Converter", assigned to the assignees of the present invention, the contents of which are hereby incorporated by reference.

FIG. 5 is a graph 500 of voltages versus time indicating example voltages for $V_{HI}$, $V_{TARGET}$, $V_{LO}$, and $V_{CxIN}$. The span of voltages between $V_{HI}$ and $V_{LO}$ define a window 502 around $V_{TARGET}$ (note that the window 502 need not be symmetrically positioned around $V_{TARGET}$, although having a symmetrical window 502 is generally preferred). A graph line 504 shows several different values for $V_{CxIN}$ (representing $V_{Cx}$) in different time periods indicated by tick marks 506a-506d on the time dimension of the graph 500. Bracket values adjacent to different portions of the $V_{CxIN}$ graph line 504 indicate corresponding pairs of bits B1 (MSB) and B0 (LSB) that may be generated by the 2-bit fast flash ADC circuit 400 of FIG. 4.

For example, at tick mark 506a, the B1, B0 pair is [00], indicating that $V_{CxIN}$ is both below $V_{TARGET}$ and inside the window 502; at tick mark 506b, the B1, B0 pair is [11], indicating that $V_{CxIN}$ is both above $V_{TARGET}$ and outside the window 502; at tick mark 506c, the B1, B0 pair is [01], indicating that $V_{CxIN}$ is both above $V_{TARGET}$ and inside the window 502; and at tick mark 506d, the B1, B0 pair is [10], indicating that $V_{CxIN}$ is both below $V_{TARGET}$ and outside the window 502.

FIG. 6 is a schematic diagram of a second embodiment of a 2-bit fast flash ADC circuit 600. Similar in many aspects to the 2-bit fast flash ADC circuit 400 of FIG. 4, the 2-bit fast flash ADC circuit 600 includes a scalar circuit 602 for scaling $V_{Cx}$ for a particular fly capacitor Cx down to a suitable input voltage $V_{CxIN}$ for the comparators 402-406. For example, $V_{Cx}$ may be about 48V, and the corresponding scaled $V_{CxIN}$ may be about 2.5V.

The 2-bit fast flash ADC circuit 600 also includes a resistive voltage divider 604 including a set of resistors R0-R3 connected in series between a general reference voltage $V_{REF}$ (e.g., about 2.5V) and a reference potential 606, such as circuit ground. Some or all of the set of resistors R0-R3 maybe be fixed or variable (variable instances of the set of resistors R0-R3 are shown in FIG. 6). In the case of variable resistors R0-R3, corresponding control signals $CTRL_{R0}$-$CTRL_{R3}$ may be provided by a controller 608 and coupled to the variable resistors R0-R3 to set associated resistance values.

The ratio of various subsets of the set of resistors R0-R3 provides different scaled voltages at nodes A, B, and C of the voltage divider 604. For example, a scaled voltage $V_{HI}$ is available at node A, where $V_{HI}=V_{REF}\times(R1+R2+R3)/(R0+R1+R2+R3)$. A scaled voltage $V_{TARGET}$ is available at node B, where $V_{TARGET}=V_{REF}\times(R2+R3)/(R0+R1+R2+R3)$. A scaled voltage $V_{LO}$ is available at node C, where $V_{LO}=V_{REF}\times(R3)/(R0+R1+R2+R3)$. Accordingly, $V_{HI}>V_{TARGET}>V_{LO}$. The respective values of the resistors R0-R3 may be settable (e.g., by laser trimming during manufacture) or adjustable (e.g., when assembled in a circuit module) or variable (e.g., by a programmed control signal from the controller 608).

Values for the set of resistors R0-R3 may be selected such that $V_{HI}>V_{TARGET}$ and $V_{TARGET}>V_{LO}$ by sufficient amounts to exceed the voltage ripple at the output of the associated power converter in order to prevent the voltage ripple from causing false indications of a capacitor being outside the high or low window voltage thresholds. Voltage ripple on a fly capacitor Cx is a function of at least the capacitance of that capacitor, the switching frequency of the associated power switches, and the load current of the power converter. It is not desirable to set a window size smaller than the steady-state voltage ripple such that a representative capacitor voltage $V_{CxIN}$ is constantly going outside of the target window. Since the voltage ripple is a function of the load current, the controller 608 may adjust the window size based on the load current.

The values for the set of resistors R0-R3 also should not be set so that the voltage range window defined by the high and low window voltage thresholds is too wide, which may result in no one fly capacitor being given priority for voltage balancing. Thus, a window size adjustment may be done to better optimize fly capacitor voltage balance priority. For example, if multiple fly capacitor voltages frequently fall outside the windows at the same time, no priority information can be obtained because all fly capacitors are out of balance. In such a case, the size of the window 502 may be increased to allow certain fly capacitor voltages to be inside the window 502 while other fly capacitor voltages fall outside the window 502 so that priority may be given to those fly capacitors falling outside the window 502.

Figure 7:
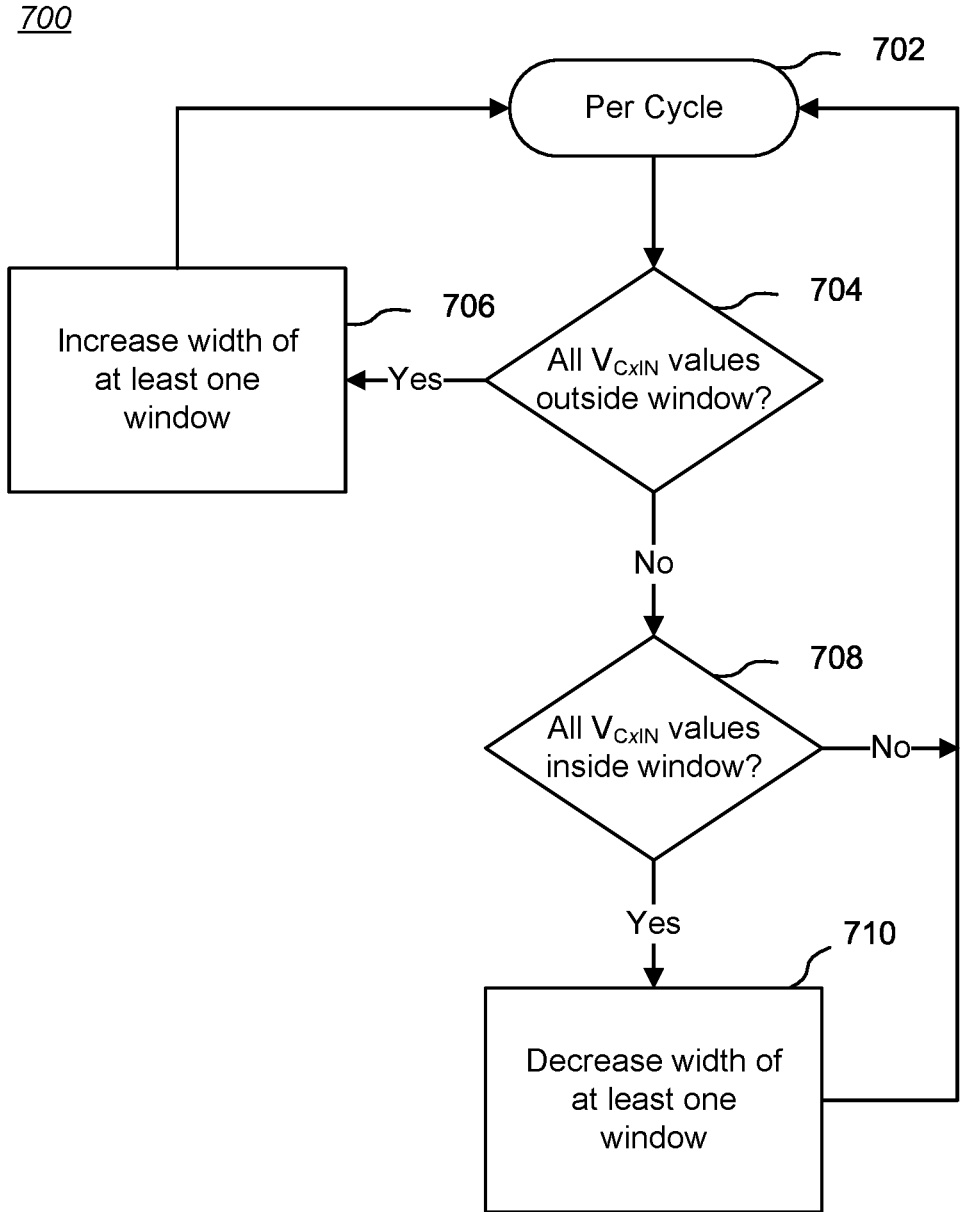
FIG. 7 is a flow chart showing one method for dynamically adjusting the width of the window.

Window sizing may be done dynamically by the controller 608 to better optimize fly capacitor voltage balancing. For example, FIG. 7 is a flow chart 700 showing one method for dynamically adjusting the width of the window 502. During each time period of measurement by the 2-bit fast flash ADC circuit 600 [Step 702], the B1, B0 output pairs from the 2-bit fast flash ADC circuits 600 for the fly capacitors Cx are compared. If all $V_{CxIN}$ values are outside the window 502 (e.g., each 2-bit fast flash ADC circuit 600 outputs B1=1) [Step 704], then the width of at least one window 502 for the 2-bit fast flash ADC circuits 600 is increased [Step 706] and the process continues during a next cycle [Step 702]. Increasing the width of a window 502 may be accomplished by adjusting the resistances of one or more of the set of resistors R0-R3 in FIG. 6.

Note that, in preferred embodiments, the window size of all capacitors is adjusted together because the voltage balance algorithm is often based on a specific goal. For example, for the case where all fly capacitors Cx have equal voltage ripple (e.g., same capacitance at the target voltage of each capacitor), then it may be desirable to set the window size the same for all fly capacitors Cx. When there is a need to increase the window size when all fly capacitors Cx are outside the window, then the window size of all fly capacitors Cx may be increased by the same amount and vice versa. This will allow the controller to achieve voltage balance to within the same voltage delta of each fly capacitor Cx. For the case of a different capacitance for each fly capacitor Cx, the window may be scaled by the ratio of the capacitance, but again, all capacitor windows would be adjusted at the same time. In other embodiments, adjusting the size of one or more windows separately may be desirable.

If all $V_{CxIN}$ values are not outside the window 502 (e.g., at least one 2-bit fast flash ADC circuit 600 outputs B1=0) [Step 704], then a second determination is made: If all $V_{CxIN}$ values are inside the window 502 (e.g., each 2-bit fast flash ADC circuit 600 outputs B1=0) [Step 708], then the width of at least one window 502 for the 2-bit fast flash ADC circuits 600 is decreased [Step 710] and the process continues during a next cycle [Step 702]. Otherwise, if all $V_{CxIN}$ values are not inside the window 502 (e.g., at last one 2-bit fast flash ADC circuit 600 outputs B1=1) [Step 708], then the process continues during a next cycle [Step 702]. Decreasing the width of a window 502 may be accomplished by adjusting the resistances of one or more of the set of resistors R0-R3 in FIG. 6. In some embodiments, a minimum window size may be set dynamically based on the voltage ripple plus some delta value, which depends mostly on the load current since the frequency and capacitance are fixed in most cases.

As should be appreciated, the steps of the process shown in FIG. 7 may be performed in a different order, other steps may be added as desired, and alternative steps may be used to perform the same or a similar function. For example, a step may be added that tests whether a majority (rather than all) of $V_{CxIN}$ values are outside the corresponding window 502, in which case the width of the windows may be increased somewhat. As a further example, a step may be added that tests whether a majority (rather than all) of $V_{CxIN}$ values are inside the corresponding window 502, in which case the width of the windows may be decreased somewhat.

In some applications, a further enhancement may be used to lessen the design requirements of the analog comparators 402-406 of the 2-bit fast flash ADC circuits 400, 600. Since both the target voltage $V_{TARGET}$ and the voltage window 502 around the $V_{TARGET}$ may be in a tight range, a partial fixed voltage amount or a percentage of a fly capacitor voltage $V_{Cx}$ may first be subtracted from the fly capacitor voltage $V_{Cx}$ so that only a partial range of the fly capacitor voltage is scaled and then compared.

More specifically, for the case where there is an essentially fixed voltage ripple on all fly capacitors Cx (e.g., all fly capacitor values are essentially identical after adjusting for voltage bias derating), it may be desirable to subtract a fixed amount of voltage to be converted by the 2-bit fast flash ADC circuits 400, 600. One example would be for a 5-level power converter where the target voltages for fly capacitors C1, C2 and C3 are $V_{C1}=\frac{1}{4}V_{IN}$, $V_{C2}=\frac{1}{2}V_{IN}$ and $V_{C3}=\frac{3}{4}V_{IN}$, respectively. In this scenario, it may be desirable to subtract $\frac{1}{8}V_{IN}$ from $V_{C1}$, $\frac{3}{8}V_{IN}$ from $V_{C2}$, and $\frac{5}{8}V_{IN}$ from $V_{C3}$, so that the comparators 402-406 are effectively only comparing (after subsequent scaling) no more than $+\frac{1}{8}V_{IN}$ around the associated target voltage $V_{TARGET}$. By doing so, the LSB voltage at an ADC circuit input can be increased to be much larger than the input offset voltage of the ADC comparators, which would dramatically relax the comparator design.

For the case of unequal capacitances among the fly capacitors Cx, it may be desirable to subtract a percentage (e.g., 75% of the associated target voltage $V_{TARGET}$) so that the ADC comparators are effectively only comparing only about +25% of each voltage $V_{Cx}$ against the corresponding reference voltages.

Figure 8:
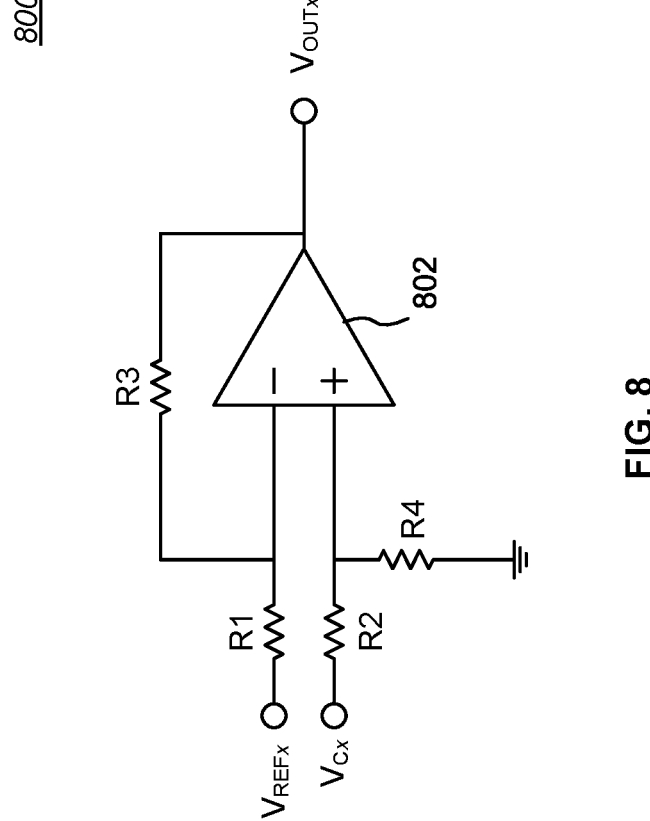
FIG. 8 is a schematic diagram of a subtractor circuit that may be used to subtract a reference voltage $V_{REFx}$ from the voltage $V_{Cx}$ across a fly capacitor Cx.

FIG. 8 is a schematic diagram of a subtractor circuit 800 that may be used to subtract a reference voltage $V_{REFx}$ from the voltage $V_{Cx}$ across a fly capacitor Cx. A first input of a differential amplifier 802 is coupled through a resistor R1 to a reference voltage $V_{REFx}$ appropriate for a selected fly capacitor Cx. For example, for a 5-level power converter, $V_{REFx}$ may be $\frac{1}{8}$ $V_{IN}$ for fly capacitor C1, $\frac{3}{8}V_{IN}$ for fly capacitor C2, and $\frac{5}{8}V_{IN}$ for fly capacitor C3. A second input of the differential amplifier 802 is coupled through a resistor R2 to the voltage $V_{Cx}$ across an associated fly capacitor Cx. A resistor R3 is coupled between the output of the differential amplifier and the first input of the differential amplifier, and a resistor R4 is coupled between the second input of the differential amplifier and a reference potential (e.g., circuit ground).

The differential amplifier provides an output, $V_{OUTx}$, which in the general case is given by Eq. 1:

$$V_{OUTx} = V_{Cx}\left(\frac{R_4}{R_2+R_4}\right)\left(\frac{R_1+R_3}{R_1}\right) - V_{REFx}\left(\frac{R_3}{R_1}\right) \qquad \text{Eq. 1}$$

If R1=R2 and R3=R4, the transfer function of Eq. 1 simplifies to Eq. 2:

$$V_{OUTx} = \frac{R_3}{R_1}(V_{Cx} - V_{REFx}) \qquad \text{Eq. 2}$$

FIG. 6 shows where an optional subtractor circuit 610 may be positioned within the 2-bit fast flash ADC circuit 600. Note that a separate scalar circuit 602 may not be needed since the R3/R1 factor in Eq. 2 may be used to provide scaling.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments that include this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end-product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 9:
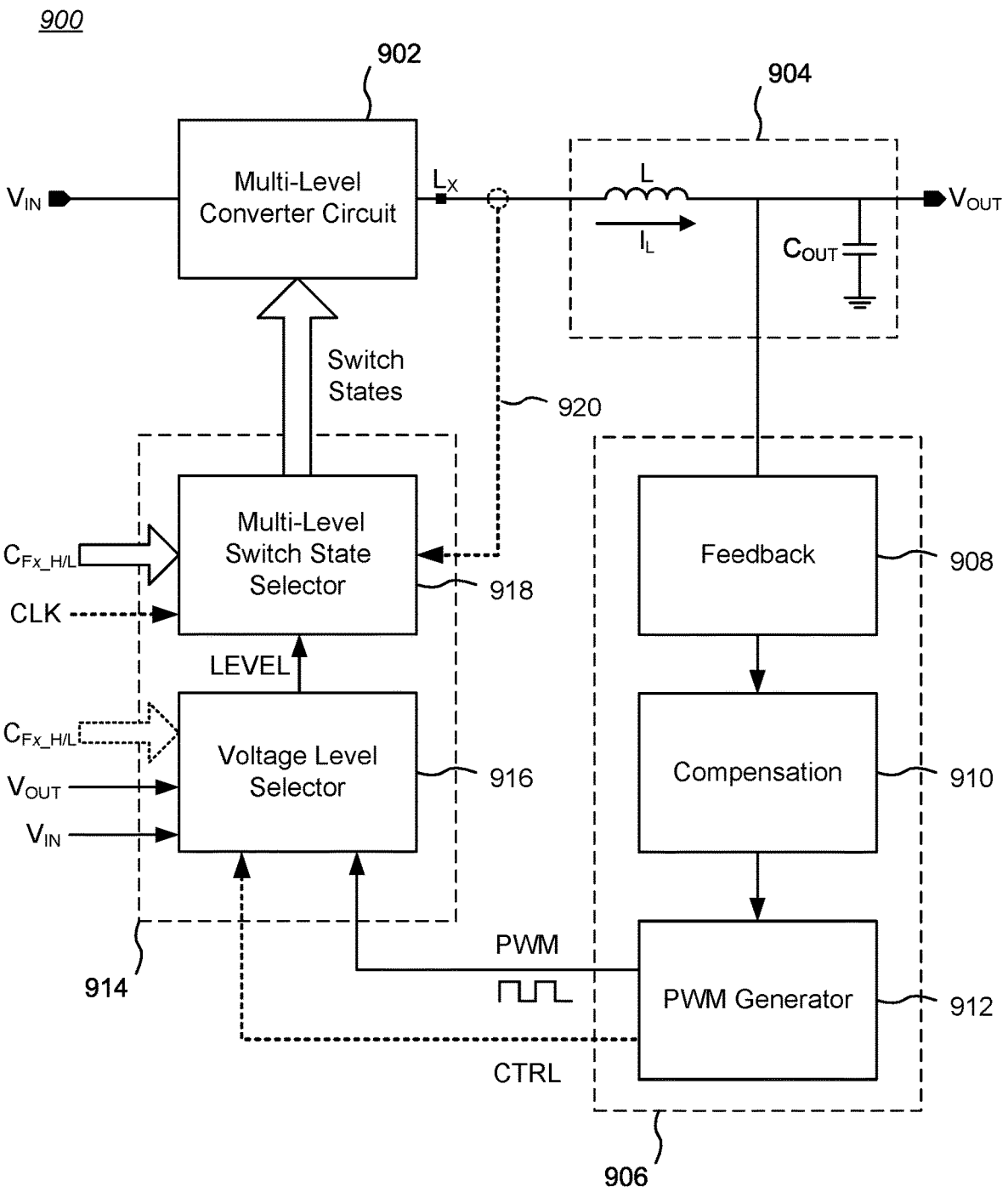
FIG. 9 is a block diagram of one embodiment of control circuitry for an M-level converter cell coupled to an output block comprising an inductor L and an output capacitor $C_{OUT}$ (conceptually, the inductor L also may be considered as being included within the M-level converter cell).

FIG. 9 is a block diagram of one embodiment of control circuitry 900 for an M-level converter cell 902 coupled to an output block 904 comprising an inductor L and an output capacitor $C_{OUT}$ (conceptually, the inductor L also may be considered as being included within the M-level converter cell 902). This example control circuitry 900 is adapted from the teachings set forth in U.S. patent application Ser. No. 17/560,767, referenced above. However, the present invention may be used in combination with other types of control circuitry for an M-level converter cell 902.

The control circuitry 900 functions as a control loop coupled to the output of the M-level converter cell 902 and to switch control inputs of the M-level converter cell 902. In general, the control circuitry 900 is configured to monitor the output (e.g., voltage and/or current) of the M-level converter cell 902 and dynamically generate a set of switch control inputs to the M-level converter cell 902 that attempt to stabilize the output voltage and/or current at specified values, taking into account variations of $V_{IN}$ and output load. In alternative embodiments, the control circuitry 900 may be configured to monitor the input of the M-level converter cell 902 (e.g., voltage and/or current) and/or an internal node of the M-level converter cell 902 (e.g., the voltage across one or more fly capacitors or the current through one or more power switches). Accordingly, most generally, the control circuitry 900 may be configured to monitor the voltage and/or current of a node (e.g., input terminal, internal node, or output terminal) of the M-level converter cell 902. The control circuitry 900 may be incorporated into, or may be separate from, the overall controller 104 for a power converter 100 embodying the M-level converter cell 902.

A first block comprises a feedback controller 906, which may be a traditional controller such as a fixed frequency voltage mode or current mode controller, a constant-on-time controller, a hysteretic controller, or any other variant. The feedback controller 906 is shown as being coupled to $V_{OUT}$ from the M-level converter cell 902. In alternative embodiments, the feedback controller 906 may be configured to monitor the input of the M-level converter cell 902 and/or an internal node of the M-level converter cell 902. The feedback controller 906 produces a signal directly or indirectly indicative of the voltage at $V_{OUT}$ that determines in general terms what needs to be done in the M-level converter cell 902 to maintain desired values for $V_{OUT}$: charge, discharge, or tri-state (i.e., open, with no current flow).

In the illustrated example, the feedback controller 906 includes a feedback circuit 908, a compensation circuit 910, and a PWM generator 912. The feedback circuit 908 may include, for example, a feedback-loop voltage detector which compares $V_{OUT}$ (or an attenuated version of $V_{OUT}$) to a reference voltage which represents a desired $V_{OUT}$ target voltage (which may be dynamic) and outputs a control signal to indicate whether $V_{OUT}$ is above or below the target voltage. The feedback-loop voltage detector may be implemented with a comparison device, such as an operational amplifier (op-amp) or transconductance amplifier (gm amplifier).

The compensation circuit 910 is configured to stabilize the closed-loop response of the feedback controller 906 by avoiding the unintentional creation of positive feedback, which may cause oscillation, and by controlling overshoot and ringing in the step response of the feedback controller 906. The compensation circuit 910 may be implemented in known manner, and may include LC and/or RC circuits.

The PWM generator 912 generates the actual PWM control signal which ultimately sets the duty cycle of the switches of the M-level converter cell 902. In some embodiments, the PWM generator 912 may pass on additional optional control signals CTRL indicating, for example, the magnitude of the difference between $V_{OUT}$ and the reference voltage (thus indicating that some levels of the M-level converter cell 902 should be bypassed to get to higher or lower levels), and the direction of that difference (e.g., $V_{OUT}$ being greater than or less than the reference voltage). In other embodiments, the optional control signals CTRL can be derived from the output of the compensation circuit 910, or from the output of the feedback circuit 908, or from a separate comparator (not shown) coupled to, for example, VOLT. One purpose of the optional control signals CTRL is for advanced control algorithms, when it may be beneficial to know how far away $V_{OUT}$ is from a target output voltage, thus allowing faster charging of the inductor L if the $V_{OUT}$ is severely under regulated.

A second block comprises an M-level controller 914, the primary function of which is to select the switch states that generate a desired $V_{OUT}$ while maintaining a charge-balance state on the fly capacitors within the M-level converter cell 902 every time an output voltage level is selected, regardless of what switch state or states were used in the past.

The M-level controller 914 includes a Voltage Level Selector 916 which receives the PWM control signal and the additional control signals CTRL if available. In addition, the Voltage Level Selector 916 may be coupled to $V_{OUT}$ and/or $V_{IN}$, and, in some embodiments, to HIGH/LOW status signals, $C_{Fx\_H/L}$, from voltage detectors coupled to corresponding fly capacitors $C_{Fx}$ within the M-level converter cell 902. A function of the Voltage Level Selector 916 is to translate the received signals to a target output voltage level (e.g., on a cycle-by-cycle basis). The Voltage Level Selector 916 typically will consider at least $V_{OUT}$ and $V_{IN}$ to determine which target level should charge or discharge the output of the M-level converter cell 902 with a desired rate.

The output of the Voltage Level Selector 916 is coupled to an M-level Switch State Selector 918, which generally would be coupled to the status signals, $C_{Fx\_H/L}$, from the capacitor voltage detectors for the fly capacitors Chr. Taking into account the target level generated by the Voltage Level Selector 916, the M-level Switch State Selector 918 determines which switch state for the desired output level should be best for capacitor charge-balance. The M-level Switch State Selector 918 may be implemented, for example, as a look-up table (LUT) or as comparison circuitry and combinatorial logic or more generalized processor circuitry. The output of the M-level Switch State Selector 918 is coupled to the switches of the M-level converter cell 902 (through appropriate level-shifter circuits and drivers circuits, as may be needed for a particular converter cell) and includes the switch state settings determined by the M-level Switch State Selector 918 (which selects the configuration of switches within the M-level converter cell 902 corresponding to a selected target level).

In general (but not always), the Voltage Level Selector 916 and the M-level Switch State Selector 918 only change their states when the PWM signal changes. For example, when the PWM signal goes high, the Voltage Level Selector 916 selects which level results in charging of the inductor L and the M-level Switch State Selector 918 sets which version to use of that level. Then when the PWM signal goes low, the Voltage Level Selector 916 selects which level should discharge the inductor L and the M-level Switch State Selector 918 sets which version of that level to use. Thus, the PWM signal is in effect the clock signal for the Voltage Level Selector 916 and the M-level Switch State Selector 918. However, there may be situations or events where it is desirable for the CTRL signals to change the state of the Voltage Level Selector 916. Further, there may be situations or events where it is desirable for the $C_{Fx\_H/L}$ status signal(s) from voltage detectors coupled to the fly capacitors $C_{Fx}$ within the M-level converter cell 902 to cause the M-level Switch State Selector 918 to select a particular configuration of power switch settings, such as when a severe mid-cycle imbalance occurs. In some embodiments, it may be useful to include a timing function that forces the M-level Switch State Selector 918 to re-evaluate the optimal version of the state periodically, for example, in order to avoid being "stuck" at one level for a very long time, potentially causing charge imbalances.

In embodiments that utilize the teachings set forth in the patent application entitled "Controlling Charge-Balance and Transients in a Multi-Level Power Converter" referenced above, the M-level controller 914 implements a control method for the M-level converter cell 902 that selects an essentially optimal switch state which moves the fly capacitors $C_{Fx}$ towards a charge-balance state every time a voltage level at the $L_X$ node is selected, regardless of what switch state or states were used in the past. Accordingly, such multi-level converter circuits are free to select a different switch state or $L_X$ voltage level every switching cycle without a need to keep track of any prior switch state or sequence of switch states.

One notable benefit of the control circuitry shown in FIG. 9 is that it enables generation of voltages in boundary zones between voltage levels, which represent unattainable output voltages for conventional multi-level DC-to-DC converter circuits.

In alternative unregulated charge-pumps embodiments, the feedback controller 906 and the Voltage Level Selector 916 may be omitted, and instead a clock signal CLK may be applied to the M-level Switch State Selector 918. The M-level Switch State Selector 918 would generate a pattern of switch state settings that periodically charge balances the fly capacitors $C_{Fx}$ regardless of what switch state or states were used in the past (as opposed to cycling through a pre-defined sequency of states). This ensures that if $V_{IN}$ changes or anomalous evens occur, the system generally always seeks charge balance for the fly capacitors $C_{Fx}$.

In some embodiments, the M-level Switch State Selector 918 may take into account the current $I_L$ flowing through the inductor L by way of an optional current-measurement input 920, which may be implemented in conventional fashion.

While FIG. 9 shows a particular embodiment of control circuitry for an M-level converter cell as modified in accordance with the present invention, it should be appreciated that other control circuits may be adapted or devised to provide suitable switching signals for the switches within a converter cell.

In power converters, particularly multi-level power converters, the power switches may be implemented with FETs, especially MOSFETs. For each power FET, a driver circuit is generally required. In addition, for some power FETs, a level shifter may be required to translate ground-referenced low-voltage logic ON/OFF signals from an analog or digital controller into a signal with the same voltage swing but not referenced to the source voltage of the power FET that the signal is driving in order to charge or discharge the gate of the power FET and thereby control the conducting or blocking state of the power FET. In some applications, the functions of a level shifter and a driver circuit may be incorporated into one circuit.

It may be desirable to provide additional control and operational circuitry (or one or more shutdown procedures) that enables reliable and efficient operation of a power converter utilizing a multi-level converter cell designed in accordance with the present disclosure. For example, in a step-down power converter, the output voltage of a converter cell is less than the input voltage of the converter cell. Shutting down or disabling (e.g., because of a fault event, such as a short) a converter cell having a designed-in inductance connected to the output while the output load current is non-zero generally requires some means for discharging the inductor current. In some embodiments, a bypass switch may be connected in parallel with a designed-in inductance connected to the output of a converter cell and controlled to be open during normal operation and closed when shutting down the converter cell or if a fault event occurs. Ideally, in order to prevent transient ringing and to provide safe discharge of the inductor current, the bypass switch can be closed before disabling converter cell switching. In alternative embodiments using MOSFETs for the main switches of the converter, the inherent body diode connected between the body and drain terminals of each MOSFET can also discharge the inductor current. Details of these solutions, as well as alternative shutdown solutions, are taught in U.S. Pat. No. 10,686,367, issued Jun. 16, 2020, entitled "Apparatus and Method for Efficient Shutdown of Adiabatic Charge Pumps", assigned to the assignee of the present invention, the contents of which are incorporated by reference.

Another consideration when combining converter cells in parallel is controlling multiple parallel power converters in order to avoid in-rush current (e.g., during a soft-start period for the power converters) and/or switch over-stress if all of the power converters are not fully operational, such as during startup or when a fault condition occurs. Conditional control may be accomplished by using node status detectors coupled to selected nodes within parallel-connected power converters to monitor voltage and/or current. Such node status detectors may be configured in some embodiments to work in parallel with an output status detector measuring the output voltage of an associated power converter during startup. The node status detectors ensure that voltages across important components (e.g., fly capacitors and/or switches) within the converter cell(s) of the power converters are within desired ranges before enabling full power steady-state operation of the parallel power converters, and otherwise prevent full power steady-state operation. The node status detectors may be coupled to a master controller that controls one or more of the parallel power converters using one or more common control signals. In furtherance of a master controller configuration, the parallel power converters may each report a power good signal (Pgood) when ready to leave a startup phase for full power steady-state operation. The master controller may essentially "AND" all such Pgood signals together, possibly along with one or more status signals from other circuits, such that the master controller does not enable full power steady-state operation of any the parallel power converter unless all of the parallel power converters are ready for that state. In essence, the Pgood signals from each parallel power converter are all tied together such that the parallel power converters may not transition out of startup phase until all the Pgood signals indicate that they are ready to transition to steady operation. Furthermore, if the Pgood signal changes due to a fault condition in one or more of the parallel power converters, the parallel power converters can transition from a steady state operation to an auto-restart or shutdown operation. Details of these solutions, as well as alternative shutdown solutions, are taught in U.S. Pat. No. 10,992,226, issued Apr. 27, 2021, entitled "Startup Detection for Parallel Power Converters", assigned to the assignee of the present invention, the contents of which are incorporated by reference.

Another consideration in operating multi-level converter cells is attaining (i.e., pre-charging) and maintaining fly capacitor voltages that are essentially fully proportionally balanced so that all switches are subjected to a similar voltage stress, since unbalanced fly capacitors can lead to breakdown of a switch (particularly FET switches) due to exposure to high voltages. One solution to both pre-charging capacitor voltages and operational balancing of capacitor voltages in a multi-level DC-to-DC converter circuit is to provide a parallel "shadow" circuit that conditionally couples a fly capacitor to a voltage source or other circuit to pre-charge that capacitor, or conditionally couples two or more fly capacitors together to transfer charge from a higher voltage capacitor to a lower voltage capacitor, or conditionally couples a fly capacitor to a voltage sink to discharge that capacitor, all under the control of real-time capacitor voltage measurements. Each parallel "shadow" circuit may comprise a switch and a resistor coupled in parallel with a main switch that is part of a multi-level converter cell (in some cases, one switch-resistor pair may span two series-connected switches). This particular solution for pre-charging and/or balancing charge on fly capacitors is very fast, provides slow pre-charging of the fly capacitors during a pre-charge period, protects switches from in-rush current, and provides stable voltages for converter cell switches. Details of this solution, as well as alternative pre-charging and charge balancing solutions, are taught in U.S. Pat. No. 10,720,843, issued Jul. 21, 2020, entitled "Multi-Level DC-DC Converter with Lossy Voltage Balancing", assigned to the assignee of the present invention, the contents of which are incorporated by reference.

Another solution to balancing capacitor voltages in a multi-level DC-to-DC converter circuit is to provide a lossless voltage balancing solution where out-of-order state transitions of a multi-level DC-to-DC converter cell are allowed to take place during normal operation. The net effect of out-of-order state transitions is to increase or decrease the voltage across specific fly capacitors, thus preventing voltage overstress on the main switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor. Details of this solution, as well as alternative charge balancing solutions, are taught in U.S. Pat. No. 10,770,974, issued Sep. 8, 2020, entitled "Multi-Level DC-DC Converter with Lossless Voltage Balancing", assigned to the assignee of the present invention, the contents of which are incorporated by reference.

An additional consideration for some embodiments is enabling operation of multi-level converter cells such that voltages can be generated in boundaries zones between voltage levels. "Boundary zones" represent unattainable output voltages for conventional multi-level DC-to-DC converter circuits. In order to generate output voltages within a boundary zone, some embodiments essentially alternate (toggle) among adjacent (or even nearby) zones by setting states of the converter cell switches in a boundary zone transition pattern. For example, a 3-level DC-to-DC converter circuit may operate in Zone 1 for a selected time and in adjacent Zone 2 for a selected time. Thus, Zones 1 and 2 are treated as a single "super-zone". More generally, in some cases, it may be useful to create super-zones using non-adjacent zones or using more than two zones (adjacent and/or non-adjacent). Details of this solution are taught in U.S. Pat. No. 10,720,842, issued Jul. 21, 2020, entitled "Multi-Level DC-DC Converter with Boundary Transition Control", assigned to the assignee of the present invention, the contents of which are incorporated by reference.

Yet another consideration for some embodiments is protection of the main power switches and other components within a power converter from stress conditions, particular from voltages that exceed the breakdown voltage of such switches (particularly FET switches). One means for protecting a multi-level power converter uses at least one high-voltage FET switch while allowing all or most other main power switches to be low-voltage FET switches.

As should be clear, the multi-level power converter embodiments described in this disclosure may be synergistically combined with the teachings of one or more of the additional control and operational circuits and methods described in this section.

Figure 10:
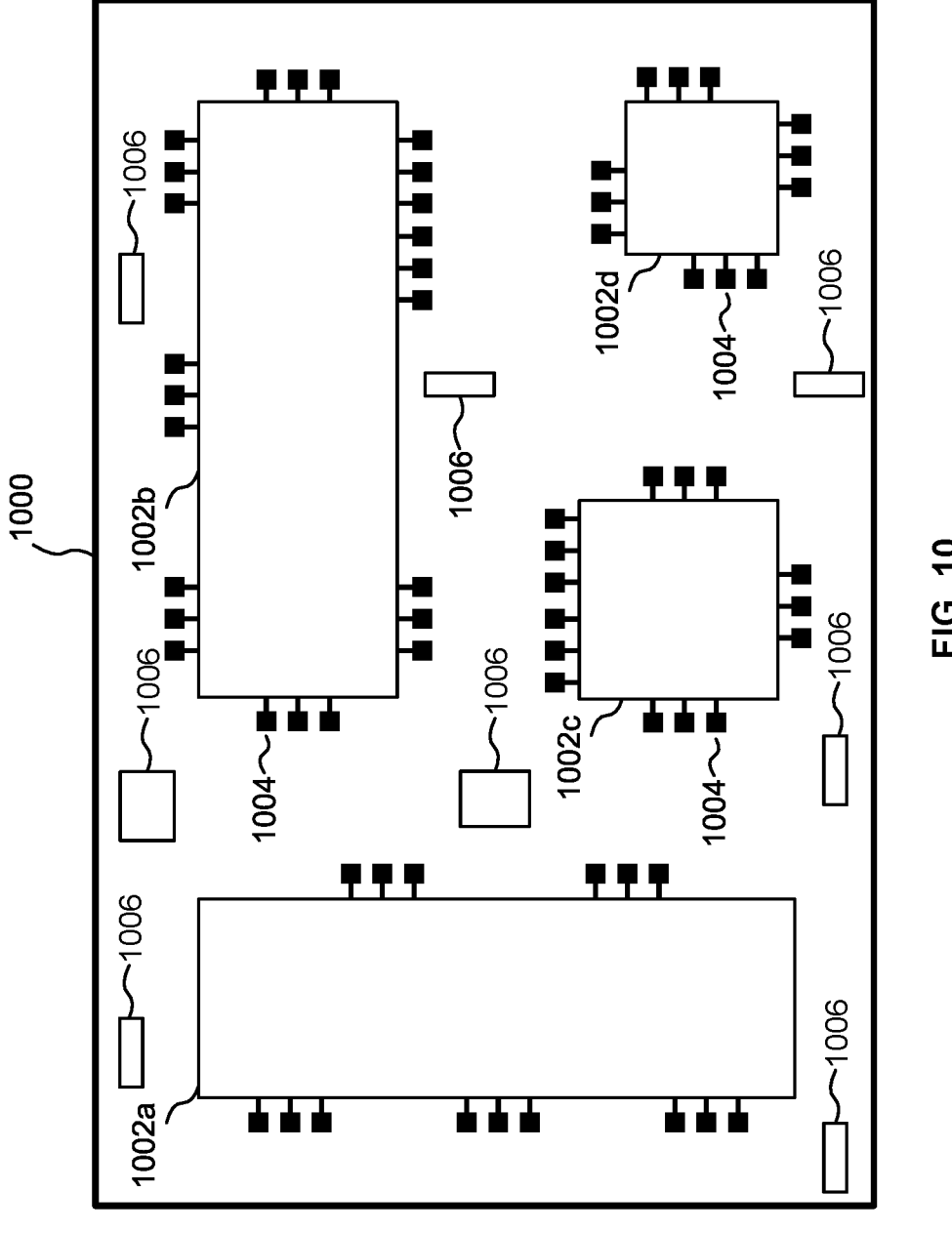
FIG. 10 is a top plan view of a substrate that may be, for example, a printed circuit board or chip module substrate (e.g., a thin-film tile).

As one example of further integration of embodiments of the present invention with other components, FIG. 10 is a top plan view of a substrate 1000 that may be, for example, a printed circuit board or chip module substrate (e.g., a thin-film tile). In the illustrated example, the substrate 1000 includes multiple ICs 1002a-1002d having terminal pads 1004 which would be interconnected by conductive vias and/or traces on and/or within the substrate 1000 or on the opposite (back) surface of the substrate 1000 (to avoid clutter, the surface conductive traces are not shown and not all terminal pads are labelled). The ICs 1002a-1002d may embody, for example, signal switches, active filters, amplifiers (including one or more LNAs), and other circuitry. For example, IC 1002b may incorporate one or more instances of a circuit like the circuits shown in FIGS. 4, 6, and 8.

The substrate 1000 may also include one or more passive devices 1006 embedded in, formed on, and/or affixed to the substrate 1000. While shown as generic rectangles, the passive devices 1006 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 1000 to other passive devices 1006 and/or the individual ICs 1002a-1002d. The front or back surface of the substrate 1000 may be used as a location for the formation of other structures.

Another aspect of the invention includes methods for converting an analog voltage to a digital output. For example, FIG. 11 is a process flow chart 1110 showing one method for converting an analog voltage from a fly capacitor of a multi-level power converter to a digital output. The method includes: comparing the analog voltage to a first reference voltage (Block 1102); outputting a first binary output indicating whether the analog voltage is higher or lower than the first reference voltage (Block 1104); comparing the analog voltage to a second reference voltage and a third reference voltage (Block 1106); and outputting a second binary output indicating whether the analog voltage is inside or outside a voltage window defined by the second reference voltage and the third reference voltage (Block 1108).

Additional aspects of the above method may include one or more of the following: wherein the voltage from the fly capacitor is scaled before being coupled to the voltage input; wherein an amount of voltage is subtracted from the voltage from the fly capacitor before being coupled to the voltage input; wherein the amount of subtracted voltage is a fixed value less than the voltage from the fly capacitor; wherein the amount of subtracted voltage is a percentage of the voltage from the fly capacitor; wherein the first reference voltage input, the second reference voltage input, and the third reference voltage input respectively receive a first reference voltage, a second reference voltage, and a third reference voltage, wherein the second reference voltage is greater than the first reference voltage and the third reference voltage is less than the first reference voltage; further including a resistive divider configured to be coupled to a reference voltage source and configured to provide the first reference voltage at a first node coupled to the first reference voltage input, the second reference voltage at a second node coupled to the second reference voltage input, and the third reference voltage at a third node coupled to the third reference voltage input; and/or wherein the resistive divider includes at least one adjustable resistance element configured to adjust at least one of the first reference voltage, the second reference voltage, and/or the third reference voltage.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOS-FET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A voltage detector circuit including:
a voltage input configured to be coupled to a voltage from a fly capacitor of a multi-level power converter;
a first comparator having a first input coupled to the voltage input and a second input coupled to a first reference voltage, the first comparator having a first output indicating whether the voltage on the voltage input is higher or lower than a voltage on the first reference voltage; and
a circuit coupled to the voltage input, a second reference voltage greater than the first reference voltage, and a third reference voltage less than the first reference voltage, the circuit configured to provide a second output of a first value when the voltage on the voltage input is inside a voltage window defined by the second reference voltage and the third reference voltage, and a second value when the voltage on the voltage input is greater than the second reference voltage, and the second value when the voltage on the voltage input is less than the third reference voltage.

2. The voltage detector circuit of claim 1, further including a controller coupled to a plurality of the voltage detector circuits corresponding to a plurality of fly capacitors, the controller configured to dynamically size the voltage window as a function of the voltages from the plurality of fly capacitors.

3. The voltage detector circuit of claim 2, wherein the controller is further configured to:
balance charge across the plurality of fly capacitors in a priority order determined based on the second output.

4. The voltage detector circuit of claim 1, further including a controller coupled to a plurality of the voltage detector circuits corresponding to a plurality of fly capacitors, the controller configured to dynamically increase a size of the voltage window if the voltages from the plurality of fly capacitors are all outside a prior voltage window size, and to dynamically decrease the size of the voltage window if the voltages from the plurality of fly capacitors are all inside the prior voltage window size.

5. The voltage detector circuit of claim 1, wherein the voltage from the fly capacitor is scaled before being coupled to the voltage input.

6. The voltage detector circuit of claim 1, wherein an amount of voltage is subtracted from the voltage from the fly capacitor before being coupled to the voltage input.

7. The voltage detector circuit of claim 6, wherein the amount of subtracted voltage is a fixed value less than the voltage from the fly capacitor.

8. The voltage detector circuit of claim 6, wherein the amount of subtracted voltage is a percentage of a target voltage for the fly capacitor.

9. The voltage detector circuit of claim 1, wherein the circuit coupled to the voltage input, the second reference voltage, and the third reference voltage includes a second comparator coupled to the voltage input and the second reference voltage and a third comparator coupled to the voltage input and the third reference voltage, the outputs of the first and second comparators being coupled to a logic gate, wherein the first and second comparators and the logic gate provide the second output indicating whether the voltage on the voltage input is inside or outside a voltage window defined by respective voltages on the second reference voltage and the third reference voltage.

10. The voltage detector circuit of claim 9, wherein the voltage from the fly capacitor is scaled before being coupled to the voltage input.

11. The voltage detector circuit of claim 9, wherein an amount of voltage is subtracted from the voltage from the fly capacitor before being coupled to the voltage input.

12. The voltage detector circuit of claim 11, wherein the amount of subtracted voltage is a fixed value less than the voltage from the fly capacitor.

13. The voltage detector circuit of claim 11, wherein the amount of subtracted voltage is a percentage of a target voltage for the fly capacitor.

14. The voltage detector circuit of claim 9, wherein the second reference voltage is greater than the first reference voltage, and the third reference voltage is less than the first reference voltage.

15. A multi-level power converter including:

a multi-level converter cell configured to receive an input voltage $V_{IN}$ from a voltage source and transform the input voltage $V_{IN}$ into an output voltage $V_{OUT}$, the multi-level converter cell including a set of power switches coupled in series and a set of fly capacitors coupled in series with certain respective power switches and in parallel with power switches in between the certain respective power switches; and for each fly capacitor in the set of fly capacitors, a voltage detector circuit including:

a voltage input coupled to an associated fly capacitor of the multi-level converter cell, the voltage input configured to receive a voltage from the associated fly capacitor, a comparator having a first input coupled to the voltage input and a second input coupled to a first reference voltage input, the comparator having a first binary output indicating whether the voltage on the voltage input is higher or lower than a voltage on the first reference voltage input, and a circuit coupled to the voltage input, a second reference voltage input with a greater voltage than the first reference voltage input, and a third reference voltage input with a lower voltage than the first reference voltage input, the circuit configured to provide a second binary output indicating a first value when the voltage on the voltage input is inside a voltage window defined by the respective voltages on the second reference voltage input and the third reference voltage input, and a second value when the voltage on the voltage input is greater than the second reference voltage input, and the second value when the voltage on the voltage input is less than the third reference voltage input.

16. The multi-level power converter of claim 15, wherein the voltage from the fly capacitor is scaled before being coupled to the voltage input.

17. The multi-level power converter of claim 15, wherein an amount of voltage is subtracted from the voltage from the fly capacitor before being coupled to the voltage input.

18. The multi-level power converter of claim 17, wherein the amount of subtracted voltage is a fixed value less than the voltage from the fly capacitor.

19. The multi-level power converter of claim 17, wherein the amount of subtracted voltage is a percentage of a target voltage for the fly capacitor.

20. The multi-level power converter of claim 15, further including a resistive divider configured to be coupled to a reference voltage source and configured to provide:

the first reference voltage at a first node coupled to the first reference voltage input;

the second reference voltage at a second node coupled to the second reference voltage input; and the third reference voltage at a third node coupled to the third reference voltage input.

21. The multi-level power converter of claim 20, wherein the resistive divider includes at least one adjustable resistance element configured to adjust at least one of the first reference voltage, the second reference voltage, and/or the third reference voltage.

22. A method of converting an analog voltage from a fly capacitor of a multi-level power converter to a digital output including:

comparing the analog voltage to a first reference voltage;

outputting a first binary output indicating whether the analog voltage is higher or lower than the first reference voltage;

comparing the analog voltage to a second reference voltage greater than the first reference voltage and a third reference voltage less than the first reference voltage; and outputting a second binary output of a first value when the analog voltage is inside a voltage window defined by the second reference voltage and the third reference voltage, and a second value when the analog voltage is greater than the second reference voltage, and the second value when the analog voltage is less than the third reference voltage.

* * * * *